Figure 1:
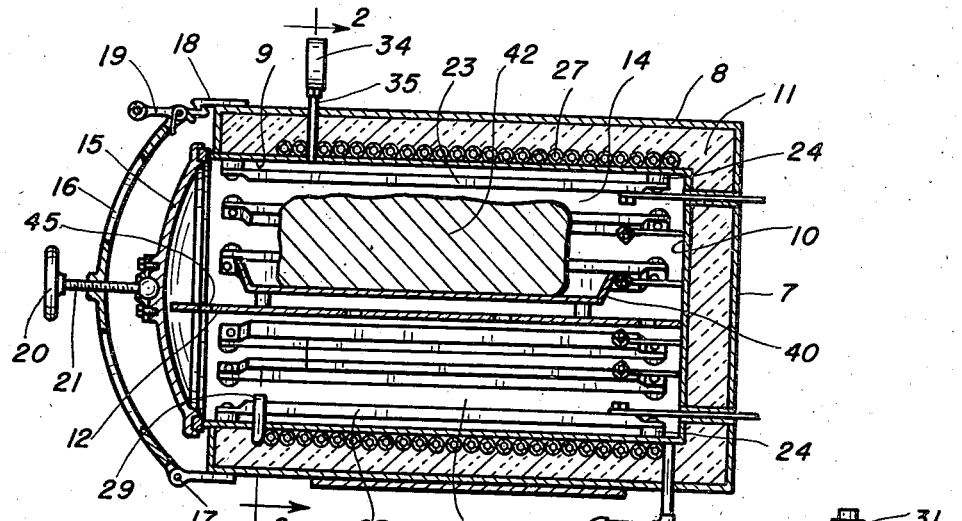

Jan. 25, 1944. H. T. AUSTIN 2,339,974

METHOD OF COOKING FOOD

Filed March 22, 1940

INVENTOR
Harold T. Austin
BY
Smith & Tuck
ATTORNEYS

Patented Jan. 25, 1944

2,339,974

UNITED STATES PATENT OFFICE 2,339,974

METHOD OF COOKING FOOD

Harold T. Austin, Seattle, Wash., assignor to Patents, Inc., a corporation of Washington Application March 22, 1940, Serial No. 325,375

8 Claims. (Cl. 99—1)

My present invention relates to an improved method of cooking food in its natural state and with a high degree of speed and without loss of important food elements. It is well known in the cookery art that the operations of baking, roasting, boiling, and the like tend to destroy or drive off from the food valuable food elements, some of which may be commonly referred to as vitamins, and thus, although the food is digestible and palatable, the consumer fails to benefit as fully as he should.

It is also well known that the present methods of cooking are slow and uneconomical because of the necessity of maintaining a high degree of heat over a protracted period of time in order to properly drive the heat into the food so that the inner cells are cooked as well as the outer cells.

In addition to the foregoing undesirable conditions mentioned, it is to be pointed out that in the restaurant business the two commodities which the restauranteur has to sell are food and space. The amount of food that can be sold at any given time depends entirely upon the availability of space for the accommodation of patrons. If it were possible to rapidly prepare or order steaks, chops, and all manner of dishes with a minimum amount of time consumed in the cooking operation, the patron is more promptly and more satisfactorily served, and at the same time he may dwell a shorter length of time in the restaurant, thereby permitting the accommodation of additional patrons more often.

In carrying out my invention, I utilize an oven or cooking unit which is provided with a suitable source of radiant heater units disposed within the cooking device and having a remote control. In addition, the cooking device is provided with means for making it air tight and for the disposition of food within the device in such a manner that it can be acted upon by the radiant heater unit.

To the interior of the cooker unit is conveyed compressed air, which may be preheated, and is used to subject and maintain the food within the cooking appliance under high air pressures.

The subject matter of this application now presented is directed to a method of cooking or preparing food which was partially disclosed as presented in an application for Letters Patent, Serial No. 278,771, filed June 12, 1939, and which is now Patent No. 2,305,056, patented December 15, 1942. This application is a continuation in part of said earlier filed application.

The principal object of my invention is to originate a method for rapidly and economically cooking food.

Another object of my invention has been to originate a method for cooking food whereby a greater proportion of the food elements are maintained within the food than has previously been obtainable by the conventional cooking methods.

A further object of the invention resides in originating a method of cooking food wherein is employed compressed air to materially aid the cooking operation.

Still another object of the invention has been the origination of a method of preparing food wherein radiant heater units may be employed in connection with compressed air during the cooking operation.

A still further object of my invention has been the provision of a method of cooking food wherein is employed pre-heated compressed air which may be injected into the heating compartment of a cooking device simultaneously with the subjection of the food to be cooked through radiant heat.

Other advantages and objects of the invention will be apparent during the course of the following description wherein, for the convenience of reference, like numerals indicate like parts in the accompanying drawing illustrating diagrammatically the principles of the apparatus used in practicing my method. It will be understood that changes and alterations may be made in the exemplifying structures illustrated in the accompanying drawing within the scope of my subjoined claims and without departing from the principles of my invention.

In the drawing

Figures 2, 3:
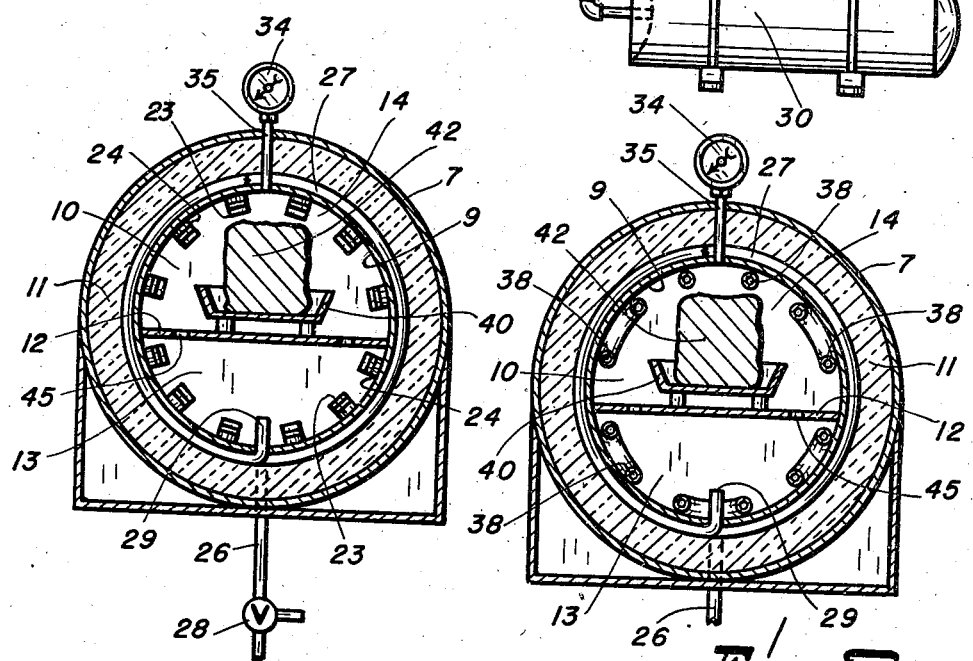

Figure 1 is a longitudinal sectional view through an exemplary type of oven in which can be practiced the principles of my invention, Figure 2 is a view in cross section taken on lines 2—2 of Figure 1, and Figure 3 is a similar cross-sectional view illustrating a modified form of the invention.

Referring to the drawing, the numeral 7 indicates the end and the numeral 8 the outer walls of a substantially cylindrical oven casing. Supported within and spaced from the walls 7 and 8 are the cylindrical chamber wall 9 and the end or head wall 10. In the space between the walls 8 and 9, and 7 and 10 would ordinarily be placed suitable insulating material 11 used for the purpose of reducing wasteful radiation of heat.

The oven proper is divided by the horizontal wall 12 into an adit or pre-heating chamber 13 and cooking chamber 14. The open end of the oven is closed by the door 15, which is supported on the arm 16 hinged at 17 to the outer jacket. The arm 16 is locked in position, at the end opposite its hinge, to the latch member 18 by means of the latch handle 19. A hand wheel 20 on a screw bar 21 having a ball socket connection with the front of the door 15 is used to firmly clamp the door over the opening of the oven when the latch 19 is secured in the latch member 18.

Within the chamber 13 and 14 are radiating heater elements 23 placed around the inner surface of the chambers 13 and 14 and spaced apart according to their need. In the example shown in Figures 1 and 2, I have indicated the radiant heater elements to be of the electric type which would necessarily require support members 24 to hold them in place within the chamber. As can be seen, some will be disposed in the chamber 13 and the remainder in the chamber 14.

A pipe 26 connected to a three-way valve 28 passes through the lower wall of the oven and conveys air from the tank 30 to the coil 27 of tubing which surrounds the chamber wall 9. A nozzle or tip 29 permits the free flow of air from the coil 27 into the chamber 13. The purpose of this coiled arrangement of the pipe around the chamber 19 is to pre-heat or super-heat the compressed air to a degree above its normal heat due to compression to facilitate the cooking operation and to take advantage of heat which might otherwise escape uneconomically. The coiling of the tube from the rear of the device towards the front is unimportant as it is obvious that the device would work with the opposed arrangement.

Air pressure is maintained in the tank 30 by means of the compressor 31 operated by the motor 32 in the conventional manner.

A pressure gauge 34 is indicated as mounted on the pipe 35 and communicates with the interior of the chamber to indicate the air pressure therein.

It will, of course, be understood that the electric strip heaters indicated in Figures 1 and 2 are connected together in suitable arrangements and to a source of electric energy. They are under the control of conventional switch mechanisms so that variations in the amount of energy radiated in the chambers 13 and 14 can be obtained. No control mechanism has been indicated for the reason that the invention in this instance does not lie therein.

In Figure 3 I have illustrated a portion of a cross-sectional view similar to Figure 2, but with a modification of the type of radiant heater element used. In this instance (Figure 3) I show pipes 38 suitably supported within the chamber 13 and 14 through which may be conducted steam, superheated water, or any other conveyable element. If, for example, steam should be used, of course suitable control valves, traps, and condensate returns would be utilized.

In both Figures 1 and 2 I have indicated in a tray 40 food 42 which may be a roast of meat or any other type of food material which it may be desired be cooked in my cooker.

The operation of the device is extremely simple and is practiced with many variations. The essential steps of the method consist in placing food within the chamber 14 and confining it there by closing the door 15 and latching it and clamping into place through the operation of the arm 16 the members 18 and 19. The hand wheel 20 and bolt 21 act to press the door tightly closed.

The actual cooking steps of the method consist in subjecting the food material disposed within the oven to compressed air and radiant heat, either simultaneously or in successive steps, as may best serve with different foods.

In some instances it may be desired to place the food in the chamber and first subject it to compressed air for a period of time and then to radiant heat to finally cook it. It is a well-known characteristic of the compressed air that it, in the higher pressures, has become heated through compression. Occasionally certain foods can be cooked through the use of compressed air alone, and without the necessity of subjecting the food to radiant heat.

In other instances the practice of the method would require the subjection of the food to compressed air and radiant heat simultaneously, but with a gradually increasing air pressure. In such a case the increased pressure would tend to drive the heat deeper into the food being cooked than would otherwise be obtainable if the pressure would remain static within the cooking chamber.

In the oven described in the foregoing specification and shown in the drawing, I have shown two chambers 13 and 14. In chamber 13 air from the source or supply tank 30 is first introduced in a pre-heated condition and then passes through distribution outlets 45 in the plate 12 into the cooking chamber 14. In this way the inherent heat of the compressed air is raised materially before it is used in the cooking operation.

I have obtained particularly good results with certain foods by simultaneously subjecting the food to radiant heat and compressed air for a pre-determined length of time and then by decompressing the oven while continuing to subject the food to more radiant heat. In this way in the initial step of the cooking operation heat is driven into the food and then the pressure is removed while the outer surface may be additionally seared or roasted or "browned," as may be desired.

Time elements vary during the cooking of practically every type of food. The best illustration that can be given of the efficiency and economy of my method of cooking is demonstrated by the following description:

A thoroughly chilled steak cut three-quarters of an inch thick was placed in a cooking receptacle, as 40, and placed in the cooking chamber 14 of the oven. The door 15 was closed and locked in place in the manner described. With an air pressure of approximately twenty pounds per square inch, and the radiant heaters on to their fullest capacity, the steak was thoroughly cooked after forty-five seconds exposure without the slightest trace of burning or rareness within the central interior.

A variant in the practice of my method relates to the pre-heating of the compressed air either by raising the pressure to such a degree that the compressed air has a higher degree of temperature, or else by subjecting the compressed air to a period of confinement in the pre-heating chamber 13, whereby its temperature is raised before it is transported to the cooking chamber. Excellent results are obtained in the preparation of certain foods by practicing this step in connection with the other steps above described.

In addition to heating or pre-heating the compressed air, a modification of the practice of my method, heretofore set forth, relates to variations of the handling of the radiant heat and the compressed air during the cooking stage. In some instances the compressed air may be continuously raised in pressure throughout all the cooking stage, while in other cases the cooking chamber may be for a short time subjected to compressed air and then decompressed and the food permitted to continue to cook while being subjected either to a low pressure of compressed air, or solely to radiant heat.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus fully described my invention what I claim as new and desire to secure by Letters Patent is:

1. A method of cooking food which comprises confining food materials in an oven, introducing and maintaining compressed air in the oven, and surrounding the food with sources of radiant heat to radiate directly upon the food material, said radiant heat being supplied independently of the compressed air.

2. A method of cooking which comprises confining food material in an oven, introducing compressed air into the oven, and surrounding the food with sources of radiant heat to radiate directly upon the food material while simultaneously and gradually increasing the pressure of the compressed air, said radiant heat being supplied independently of the compressed air.

3. A method of cooking which comprises confining food material in an oven, introducing and maintaining compressed air in the oven at a uniform degree of compression, surrounding the food with sources of radiant heat to radiate directly upon the food material, said radiant heat being supplied independently of the compressed air, and raising the intensity of the radiant heat.

4. A method of cooking which comprises confining food material in an oven, introducing and maintaining compressed air in the oven while simultaneously surrounding the food with sources of radiant heat to radiate directly upon the food during a predetermined length of time, said radiant heat being supplied independently of the compressed air, and then discontinuing the irradiation of the food while continuing to maintain the food material under the attained pressure of compressed air.

5. A method of cooking which comprises confining food material to the cooking chamber of an oven, introducing compressed air into a preheating chamber and there heating said air, transporting said preheated compressed air into the cooking chamber, maintaining the air in the cooking chamber under compression while simultaneously surrounding the food with sources of radiant energy to radiate directly upon the food, said radiant heat being supplied independently of the compressed air.

6. A method of cooking which comprises confining food material in an oven, subjecting compressed air to radiant heat and introducing and maintaining the same in the oven in a uniform degree of compression while simultaneously surrounding the food with sources of radiant heat to radiate directly upon said food, said radiant heat being supplied independently of the compressed air.

7. A method of cooking which comprises confining food material in an oven, introducing preheated compressed air into the oven and maintaining it under compression, and surrounding the food with sources of radiant heat to radiate directly upon said food material, said radiant heat being supplied independently of the compressed air.

8. A method of cooking which comprises confining food material in an oven, introducing and maintaining preheated compressed air in the oven while simultaneously surrounding the food with sources of radiant heat to radiate directly upon said food material during a predetermined length of time, said radiant heat being supplied to said oven independently of said compressed air, and finally decompressing said oven while continuing to subject the food material to said radiant heat.

HAROLD T. AUSTIN.